(12) United States Patent
Kettunen et al.

(10) Patent No.: US 12,510,244 B2
(45) Date of Patent: Dec. 30, 2025

(54) METHOD OF PREVENTING BLOCKAGE OF CIRCULATING BED MATERIAL IN A CIRCULATING FLUIDIZED BED REACTOR ARRANGEMENT

(71) Applicant: SUMITOMO SHI FW ENERGIA OY, Espoo (FI)

(72) Inventors: Ari Kettunen, Leppävirta (FI); Teri Hiltunen, Leppävirta (FI)

(73) Assignee: Sumitomo SHI FW Energia OY, Espoo (FI)

( * ) Notice: Subject to any disclaimer, the term of this patent is extended or adjusted under 35 U.S.C. 154(b) by 443 days.

(21) Appl. No.: 18/004,525

(22) PCT Filed: Jul. 14, 2020

(86) PCT No.: PCT/EP2020/069879
§ 371 (c)(1),
(2) Date: Jan. 6, 2023

(87) PCT Pub. No.: WO2022/012742
PCT Pub. Date: Jan. 20, 2022

(65) Prior Publication Data
US 2023/0220989 A1 Jul. 13, 2023

(51) Int. Cl.
*F23C 10/24* (2006.01)
*F23C 10/32* (2006.01)
(Continued)

(52) U.S. Cl.
CPC .............. *F23C 10/32* (2013.01); *F23C 10/24* (2013.01); *F23N 1/002* (2013.01); *F23N 5/242* (2013.01);
(Continued)

(58) Field of Classification Search
CPC .... F23C 10/32; F23C 10/24; F23C 2206/102; F23C 2900/10008; F23N 1/002; F23N 5/242; F23N 2225/06
(Continued)

(56) References Cited

U.S. PATENT DOCUMENTS

| 4,075,953 A | 2/1978 | Sowards |
| 4,133,759 A * | 1/1979 | Ikeda ..................... B01D 15/02 210/138 |

(Continued)

FOREIGN PATENT DOCUMENTS

| AT | 513490 B1 | 5/2014 |
| CN | 1455150 A | 11/2003 |

(Continued)

OTHER PUBLICATIONS

Arjunwadkar, A. et al., "A review of some operation and maintenance issues of CFBC boilers" Apr. 2, 2016. Applied Thermal Engineering, vol. 2., pp. 672 to 694 (23 pages).

(Continued)

*Primary Examiner* — Avinash A Savani
(74) *Attorney, Agent, or Firm* — Venable LLP

(57) ABSTRACT

A method of preventing blockage of circulating bed material in a circulating fluidized bed reactor includes collecting a continuously flowing bed of solid particles in a gas lock in a return leg of a reactor, measuring gas lock bed pressure values within the bed of the particles, generating a gas lock bed height indication signal on the basis of measured gas lock bed pressure values. A definition stage includes defining and storing to a control system a range of normal gas lock bed height indication signals, formed in normal circulation flow conditions, as a function of the reactor load, and defining and storing to the digital control system a reactor load dependent alarm criterion. The method includes com- (Continued)

paring a current gas lock bed height indication signal with the reactor load dependent alarm criterion, and decreasing the reactor load if the current indication signal fulfils the reactor load dependent alarm criterion.

15 Claims, 2 Drawing Sheets

(51) Int. Cl.
    *F23N 1/00*     (2006.01)
    *F23N 5/24*     (2006.01)

(52) U.S. Cl.
    CPC .................. *F23C 2206/102* (2013.01); *F23C 2900/10008* (2013.01); *F23N 2225/06* (2020.01)

(58) Field of Classification Search
    USPC .......................................................... 431/12
    See application file for complete search history.

(56) References Cited

U.S. PATENT DOCUMENTS

| | | | |
|---|---|---|---|
| 4,324,620 A * | 4/1982 | Ito | C10B 49/22 202/89 |
| 4,544,375 A | 10/1985 | Rehmat et al. | |
| 5,480,617 A * | 1/1996 | Uhlemann | B01J 2/16 34/585 |
| 6,923,128 B2 | 8/2005 | Seeber | |
| 8,292,977 B2 | 10/2012 | Suda et al. | |
| 9,687,806 B2 | 6/2017 | Schmid et al. | |
| 2010/0024297 A1 | 2/2010 | Suda et al. | |

FOREIGN PATENT DOCUMENTS

| | | |
|---|---|---|
| CN | 107389971 A | 11/2017 |
| CN | 110017477 A | 7/2019 |
| EP | 1 075 626 B1 | 2/2001 |
| EP | 1228332 A1 | 1/2005 |
| EP | 2 361 148 B1 | 8/2011 |
| EP | 2 516 927 B1 | 10/2012 |
| EP | 3 322 507 B1 | 5/2018 |
| FI | 107758 B | 9/2001 |
| FR | 2850157 A1 | 7/2004 |
| JP | 2001-1289406 A | 10/2001 |
| JP | 2005-061654 A | 3/2005 |
| JP | 2006-194466 A | 7/2006 |
| JP | 2007-046819 A | 2/2007 |
| JP | 4254004 B2 | 4/2009 |
| JP | 4443481 B2 | 3/2010 |
| KR | 2018-0035603 A | 4/2018 |
| KR | 101 879 637 B1 | 7/2018 |
| TW | 2017-40058 A | 11/2017 |

OTHER PUBLICATIONS

International Search Report and Written Opinion of the ISA for International Patent application No. PCT/EP2020/069879, dated Feb. 10, 2021 (11 pages).
Examination Report issued Mar. 20, 2024, in corresponding Australian Patent Application No. 2020458418 (2 pages).
Certificate of Grant issued Mar. 21, 2024, in Japanese Patent Application No. 2022-581348 (2 pages).
Communication under Rule 71(3) EPC issued Mar. 22, 2024, in corresponding European Patent Application No. 20743614.8, and text intended for grant (31 pages).
Preliminary Office Action issued Apr. 16, 2024, in corresponding Brazilian Patent Application No. BR112023000273-7, with English translation (8 pages).
Notice of Grounds for Rejection issued Jul. 30, 2024, in corresponding Korean Patent Application No. 10-2023-7003929, with English translation (10 pages).
Examination Report issued on Oct. 8, 2023, in corresponding Saudi Arabian Patent Application No. 523442134, with English abstract (13 pages).
Conn, R.E., "Laboratory techniques for evaluating ash agglomeration potential in petroleum coke fired circulating fluidized bed combustors", 1995. Fuel Processing Technology, vol. 44, pp. 95 to 103 (9 pages).
Grubor, B.D. et al., "Biomass FBC Combustion—Bed Agglomeration Problems" May 7 to 10, 1995, The 13th International Conference on Fluidized Bed Combustion, The American Society of. Mechanical Engineers, vol. 1., pp. 515 to 522 (9 pages).
Davies, C. et al., "Pressure fluctuations in a fluidized bed: a potential route to the continuous estimation of particle size" 1997, IPENZ Transactions, vol. 24, No. 1, pp. 12 to 20 , which is the updated version of Davies, C.E. et al., in Powder Technology, Jul. 1996, vol. 88, No. 1 (9 pages).
Chirone, R. et al., "Mechanism and prediction of bed agglomeration during fluidized bed combustion of a biomass fuel: Effect of the reactor scale", Oct. 15, 2006, Chemical Engineering Journal, vol. 123, No. 3, pp. 71 to 80 (9 pages).
Kiel, J.H.A., "Early Agglomeration Recognition System (EARS)", Jun. 5, 2006, Journal of Energy Resources Technology (5 pages).
Cocco, R. et al., "Introduction to Fluidization", Nov. 2014, American Institute of Chemical Engineers (AIChE), pp. 21 to 29 (9 pages).
Gattering, B., "Predicting Agglomeration in Biomass Fired Fluidized Beds" Apr. 16, 2015. (188 pages).
Shabanian, J. et al., "Application of Temperature and Pressure Signals for Early Detection of Defluidization Conditions" 2015, The 7th World Congress on Particle Technology (WCPT7), Procedia Engineering, vol. 102, pp. 1006 to 1015 (11 pages).
International Preliminary Report on Patentability issued in International Application No. PCT/EP2020/069879 on Jan. 26, 2023 (7 pages).
Examination Report issued on May 1, 2023, in corresponding Indian Patent Application No. 202347008434 (6 pages).
Philippine Examination Report issued Jun. 17, 2025, in corresponding Philippine Patent Application No. Jan. 2023/550021, with English translation (5 pages).
Indonesian Office Action issued Jul. 29, 2025, in corresponding Indonesian Patent Application No. P00202301064 (6 pages).
Chinese Office Action issued Mar. 1, 2025, in corresponding Chinese Patent Application No. 202080103029.6, with English translation (72 pages).
Korean Decision to Grant issued Mar. 20, 2025, in corresponding Korean Patent Application No. 10-2023-7003929, with English translation (5 pages).

\* cited by examiner

METHOD OF PREVENTING BLOCKAGE OF CIRCULATING BED MATERIAL IN A CIRCULATING FLUIDIZED BED REACTOR ARRANGEMENT

BACKGROUND OF THE INVENTION

Field of the Invention

The present invention relates to a method of preventing blockage of circulating bed material in a circulating fluidized bed reactor arrangement. Thus, the invention relates especially to preventing blockage in a return leg, particularly, in a gas lock of a return leg, of a circulating fluidized bed reactor.

Description of Related Art

Circulating fluidized bed reactors, such as circulating fluidized bed boilers, generally comprise a furnace, a particle separator for separating particles from exhaust gas emanating from the upper part of the furnace, and a return leg for returning separated particles from the particle separator back to a lower portion of the furnace, which return leg comprises a gas lock, such as a wall seal or a loop seal, for preventing upstream gas flow in the return leg.

One problem that may sometimes occur in circulating fluidized bed reactors is that the return leg, most often the gas lock in the return leg, gets blocked. Such blocking may be caused by different reasons, including falling of deposits from the upper part of the return leg, pulverizing of particles of the bed material to too small a size for fluidization as required for proper operation of the gas lock, or agglomeration of particles of the bed material to agglomerates preventing flowing of the material. Complete or nearly complete blocking of the return leg usually causes shutdown of the reactor, which may lead to laborious and time-consuming service operations. In many cases, an occurred blockage can be removed only by cooling the reactor, thereafter, cleaning the return leg and finally restarting of the reactor, which may cause an outage in the production of the reactor lasting typically one day or even more. It has turned out that blocking of the return leg and shutdown of the reactor can in some cases be avoided if approaching of the blocking is predicted, and suitable preventive measures are started, sufficiently in advance.

Korean Patent document KR 101879637 B1 discloses a method of controlling the operation of a loop seal by adjusting supply of fluidizing air to a bed of particles in the loop seal on the basis of measured pressure difference within the bed. Disclosed are in particular the method steps of measuring gas lock bed pressure values $\Delta p$ within the continuously flowing bed of the solid particles, comparing measured $\Delta p$ values with $\Delta p$ values of a reference pressure difference measured and calculated in the initial operating condition. U.S. Pat. No. 8,292,977 discloses an arrangement for controlling the amount of circulating particles in a combined circulating fluidized bed system based on controlling removal of exhaust gas and product gas from the system so as to control the pressures in a gasifier chamber and an outlet chamber in the return leg of the system. Neither of these documents, however, relates to observing blocking, or predicting and preventing an approaching blockage in the loop seal or the return leg.

Japanese Patent document JP 4254004 B2 discloses an arrangement for estimating the amount of sand circulation in a circulating fluidized bed boiler by models based on measured vertical pressure and temperature distributions in the furnace, pressure and temperature at the inlet and outlet of a heat exchange chamber in the return leg of the boiler and the amount of water supplied to and the temperature of steam obtained from the heat exchanger. Japanese patent document JP 444348162 discloses a system for diagnosing clogging of bed material in a bed material circulation path relating to a bed height adjusting device of a pressurized fluidized bed boiler. The bed material circulation path comprises a plurality of differential pressure gauges, thermometers, and flow meters of pumped air at selected locations of the path. Occurrence of clogging is determined by using the measured values and a clog occurrence site database. Neither of these documents, however, teaches how to predict or to prevent an approaching blockage.

It is well-known that harmful defluidization of a fluidized bed can be caused by agglomeration or sintering of the bed particles, and, therefore, several suggestions of bed materials have been presented to avoid or to minimize the problem. U.S. Pat. No. 4,075,953 suggests that in combustion of organic waste in a fluidized bed, the tendency of bed material to fuse and to cake, as well as particle break down, can be reduced by using a bed material comprising olivine sand. Grubor et al. suggest in Proc. of the 13th International Conference on Fluidized Bed Combustion, 1995, 'Biomass FBC Combustion—Bed Agglomeration Problems', pages 515 to 522, that agglomeration and sintering problems in combusting cultivated biomass in a fluidized bed can be minimized by using ferric oxide as bed material. European patent document EP 1 075 626 B1 suggests that risk of sintering in combusting difficult fuels in a fluidized bed can be decreased by using bed material of mineral particles having a quartz content less than five percent.

U.S. Pat. No. 4,544,375 suggests preventing ash sintering and fluidized bed defluidization by measuring ash content relative to carbon content in the bed, for example, by monitoring average density of the bed particles by measuring pressure drop within the fluidized bed, and removing ash from the fluidized bed when the ash content relative to carbon content exceeds a predetermined value.

It is generally known that rapid pressure fluctuations take place in a fluidized bed, which pressure fluctuations correlate with size and number of gas bubbles in the bed. C. E. Davies and K. Fenton show, in Powder Technology, Volume 88, Issue 1, July 1996, pages 89 to 93, that the pressure fluctuations in a fluidized bed decrease with increasing particle size, and Chirone et al show, in Chem. Eng. J. 123 (2006) 71 to 80, that starting from the onset of agglomeration, the variance of pressure fluctuations in a fluidized bed decreases during about two hours to sixty to seventy percent of its original value, and an abrupt transition to a fixed bed at defluidization invokes a significant peak in the pressure variance. Thus, monitoring and analyzing the variance of pressure fluctuations in the bed enables early recognition of approaching defluidization of the bed. Correspondingly, J. Shabanian et al suggest, in Procedia Engineering 102 (2015) 1006 to 1015, that due to growing of bubbles, in-bed differential pressure drop decreases when the bed is approaching defluidization, which effect can be used for early detection of defluidization conditions in a bubbling fluidized bed. Methods used for observing or preventing agglomeration in a static fluidized bed are generally not efficient, if at all usable, for observing and preventing blocking of a continuously flowing fluidized bed in a gas lock of a return leg.

An object of the present invention is to provide a method of preventing blockage of circulating material in a return leg of a circulating fluidized bed reactor, which is straightforward to use in practice and wherein the limitations of the methods disclosed in the above mentioned prior art documents are minimized or eliminated.

SUMMARY OF THE INVENTION

The above cited problems of the prior art are solved or at least minimized by the solutions defined in the appended independent claims. The dependent claims define advantageous embodiments of the present invention.

According to one aspect, the present invention provides a method of preventing blockage of circulating bed material in a circulating fluidized bed reactor arrangement, the method comprising steps of defining a reactor load at a digital control system of the reactor, feeding fuel and combustion gas at a predefined rate based on the reactor load into a furnace of the circulating fluidized bed reactor arrangement, combusting the fuel with the combustion gas in the furnace and emanating flue gases and solid particles from the furnace into a flue gas channel, separating solid particles from the flue gases in a particle separator arranged in the flue gas channel and circulating a flow of solid particles from the particle separator via a return leg back into the furnace, and collecting a continuously flowing bed of the solid particles in a gas lock in the return leg, measuring gas lock bed pressure values within the continuously flowing bed of particles, forming a gas lock bed height indication signal on the basis of measured gas lock bed pressure values, wherein a definition stage of the method comprises the steps of changing the reactor load defined at the digital control system sequentially to multiple load values, defining and storing to the digital control system a range of normal gas lock bed height indication signals, formed in normal solid particles circulation flow conditions, as a function of the reactor load, and defining and storing to the digital control system a reactor load dependent alarm criterion, the fulfillment of which comprises that a current gas lock bed height indication signal is outside the range of normal gas lock bed height indication signals for the prevailing reactor load, for indicating deviation in the solid particles circulation flow, and a stage of using the method comprises the steps of comparing at predetermined intervals a current gas lock bed height indication signal with the reactor load dependent alarm criterion, and decreasing the reactor load in case the current gas lock bed height indication signal fulfils the reactor load dependent alarm criterion, for preventing blockage of the gas lock.

The present invention is based on the observation of the present inventors that pressure values measured within the continuously flowing fluidized bed of particles in the gas lock can show abnormal behavior already several hours before a shutdown, causing blocking occurs in the return leg. Because gas lock bed pressure values are typically rapidly fluctuating, more smoothly varying bed height indication signals are, according to the present invention, advantageously formed on the basis of the measured gas lock bed pressure values. However, depending on the method and equipment used for measuring the gas lock bed pressure, it may in some cases be possible to use the gas lock bed pressure values, as such, as the gas lock bed height indication signals.

Because of the continuous flow of solid particles via the fluidized bed in the gas lock, the gas lock bed pressure values, and the gas lock bed height indication signals, may run into an unregularly oscillating state, wherein they recurrently grow and decrease with a considerable amplitude, well before the occurrence of an actual blockage. Therefore, when an abnormal behavior of the gas lock bed height indication signal is observed, it is possible to begin measures to avoid serious consequences of blocking of the return leg before any detrimental effects occur. A key to the method according to the present invention is to monitor and to analyze the gas lock bed height indication signals obtained from the gas lock bed pressure values.

Because the continuously flowing fluidized bed in the gas lock is formed of particles separated by a particle separator from the flue gas emanating from the furnace, the gas lock bed height depends mainly on the reactor load, especially, on the rate of combustion gas and fuel feeding into the furnace. In order to make possible to observe abnormal gas lock bed height indication signals, it is necessary to calibrate the gas lock bed height indication signals by changing the reactor load sequentially to multiple load values and forming or measuring bed height indication signals, in normal solid particles circulation flow conditions, as a function of the reactor load. By using the so formed series of bed height indication signals, it is possible to define a reactor load dependent range of normal gas lock bed height indication signals, to be stored to the digital control system of the reactor. Then, it is possible to define and to store to the digital control system a reactor load dependent alarm criterion, to recognize an abnormality, or deviation, in the solid particles circulation flow. Fulfilment of the alarm criterion advantageously comprises at least that the gas lock bed height indication signal is outside the range of normal gas lock bed height indication signals for the prevailing reactor load.

Gas lock bed height indication signals used to define the ranges of normal gas lock bed height indication signals, and corresponding reactor load dependent alarm criterions, are advantageously based on measured differential gas lock bed pressure values, i.e., on differences of pressure values measured in a lower portion of the fluidized bed in the gas lock, and pressure values measured, for example, at a higher location in the return leg. It is also possible that the reactor load dependent alarm criterions are defined as more complicated functions of the gas lock bed pressure values including, for example, time derivates, oscillatory changes or trends of the gas lock bed pressure values, as will be explained below.

As stated above, the range of normal gas lock bed height indication signals depends on the rate of feeding fuel and combustion gas to the furnace. However, in case inert bed material is fed to the furnace, the range of normal gas lock bed height indication signals also depends on the feeding rate of inert bed material. In case the type or particle size of fuel and inert bed material fed to the furnace varies, the range of normal gas lock bed height indication signals typically also depends on the type and particle size of the fuel and inert bed material. It may then be needed to store to the digital control system the normal range of the gas lock pressure signal as a data base defined by suitable ranges of feeding rates and, as needed, types of fuel and inert bed material fed to the furnace. In some cases, it may be useful to define the range of normal gas lock bed height indication signals also as a function of other operation parameters, such as flue gas recirculation rate, of the reactor arrangement. In this description, the term load dependent means generally a dependence on any operation parameters of the reactor, as described above.

Fluidized bed in the gas lock of a circulating fluidized bed reactor is generally a bubbling bed that shows, due to bubbles raising through the bed, a rapidly fluctuating bed pressure. Such fluctuations in the bed pressure may depend, for example, on the particle size of the bed, but generally, they are not associated with problems in the flow of particles through the fluidized bed in the gas lock. As noted in the description of related art, C. E. Davies and K. Fenton disclose in Powder Technology, Volume 88, Issue 1, July 1996, pages 89 to 93, and Chirone et al disclose in Chem. Eng. J. 123 (2006) 71 to 80, methods of observing agglomeration in a static fluidized bed based on analyzing by gas bubbles caused rapid fluctuations in the bed pressure. But gas bubbles caused rapid pressure fluctuations in bed pressure values may behave differently when fluidizing problems of the solid particles are caused by different reasons, such as falling of deposits from above the bed, pulverizing of the particles of bed material to too small a size for proper fluidization, or agglomeration of particles of the bed material to large, fluidization preventing agglomerates. The present method differs from these methods in not observing and analyzing such rapid fluctuations, but more smooth changes in the bed pressure caused by changes of the actual bed height caused by varying flow conditions of the particles. An advantage of using bed height indication signals to recognize flow problems in the circulating bed material is to have a similar indication of an approaching blockage of the return leg caused by different reasons.

The gas lock bed pressure signal used according to the present invention to indicate abnormal behavior of the flow of particles trough the fluidized bed is advantageously averaged over a predefined time, preferably at least ten seconds, even more preferably at least thirty seconds. Correspondingly, the reactor load dependent alarm criterion, i.e., a criterion for interpreting that a blockage of the gas lock may be approaching, includes that the gas lock bed pressure signals are averaged over a predefined measuring time. Thus, if such gas lock bed height indication signals are outside the range of normal gas lock bed height indication signals, it can be concluded that a blockage may be approaching, and suitable counter measures should be started.

According to an embodiment of the present invention, the definition stage of the method comprises defining and storing in the digital control system a reactor load dependent upper limit for the gas lock bed height indication signal, and the fulfillment of the reactor load dependent alarm criterion comprises that a current gas lock bed height indication signal is above the upper limit for the prevailing reactor load. An approaching blockage of the return leg may cause momentary increase of the bed height above its normal range, which is then observed as an increased gas lock bed pressure value. It is to be noticed that this effect is opposite to the effect of approaching agglomeration of a stationary fluidized bed, which shows up as decreasing bed pressure, as reported by J. Shabanian et al in Procedia Engineering 102 (2015) 1006 to 1015.

According to an embodiment of the present invention the method comprises an algorithm to observe oscillations of the gas lock bed height indication signals, and the fulfillment of the reactor load dependent alarm criterion comprises that oscillations exist. As an example, existence of oscillations could be based on the observation that suitably averaged gas lock bed height indication signal is at least three times within a predefined time, say five minutes, above a predefined upper limit.

According to an embodiment of the present invention, the method comprises a further step of measuring a furnace bed pressure signal within the fast fluidized bed of particles in the furnace, or, in other words, at the lower portion of the furnace. Then, the fulfillment of the reactor load dependent alarm criterion advantageously also comprises the requirement that the furnace bed pressure signal executes a decreasing trend at the same time as the gas lock bed pressure signal executes an increasing trend. Such a decreasing trend of the furnace bed pressure signal simultaneously with an increasing trend of the gas lock bed pressure signal suggests that the amount of solid particles in the furnace is decreasing because an increasing amount of particles is collecting to the return leg.

According to an embodiment of the present invention, the criterion for a decreasing trend of the furnace bed pressure value includes that by at least five percent monotonously decreasing values are observed in at least three consecutive, averaged furnace pressure values. Correspondingly, the criterion for an increasing trend of the gas lock bed height indication signal includes that by at least five percent monotonously increasing values are observed in at least three consecutive gas lock bed height indication signals.

According to the present invention, various counter measures can be started in case the reactor load dependent alarm criterion is fulfilled, i.e., when indication of an approaching blockage is received. As mentioned above, because the blocking relates to the flow of particles through the bed collected in the gas lock, a primary counter measure is to decrease the flow of particles by decreasing the reactor load, i.e., the rate of feeding combustion gas and fuel into the furnace of the reactor. Decreasing the flow of particles may shake the bed in a way that removes the risk of blockage and induces a stable flow of particles. Decreasing the load also reduces the reactor temperature level which in turn reduces stickiness of flowing particles in case of alkali concentrated material resulting in improved flowability of the material in the gas lock system.

When indication of an approaching blockage is received, another preferred counter measure, to prevent the blocking, is to start feeding inert bed material, or to increase the rate of feeding inert bed material, into the furnace. Increasing the feeding of inert bed material may decrease harmful effects, such as forming of sticky compounds, caused by the fuel particles. In addition to changing the average composition of the bed material, feeding of inert bed material also generally enhances change of the bed material. Increasing the feeding of inert bed material is advantageously performed simultaneously with the further counter measure of starting to discharge bottom ash, or increasing the rate of discharging bottom ash, from the furnace.

According to a further embodiment of the present invention, the method comprises, in case the reactor load dependent alarm criterion is fulfilled, changing a type of the fuel fed to the furnace to another type of fuel. Alternatively, or in addition, the method may comprise, in case the reactor load dependent alarm criterion is fulfilled, the further steps of starting to feed limestone, or increasing feeding of limestone, into the furnace. Also, it is possible that the method comprises, in case the reactor load dependent alarm criterion is fulfilled, the steps of starting to feed, or increasing feeding of, a reagent suitable to diminish forming of alkaline compounds that have a low melting temperature into the furnace. Suitable reagents include alkali getters, such as clay or kaolin. Advantageously, any of the embodiments described above comprises, in case the reactor load dependent alarm criterion is fulfilled, the further step of giving in the digital control system an alarm for potential blockage.

In case the fulfillment of the reactor load dependent alarm criterion is ceased, the method advantageously comprises the steps of removing all or a part of the counter measures described above, especially, the method then comprises the step of increasing the reactor load.

The above brief description, as well as further objects, features, and advantages of the present invention will be more fully appreciated by reference to the following detailed description of the presently preferred, but nonetheless illustrative, embodiments in accordance with the present invention, when taken in conjunction with the accompanying drawings.

DETAILED DESCRIPTION OF THE INVENTION

Figure 1:
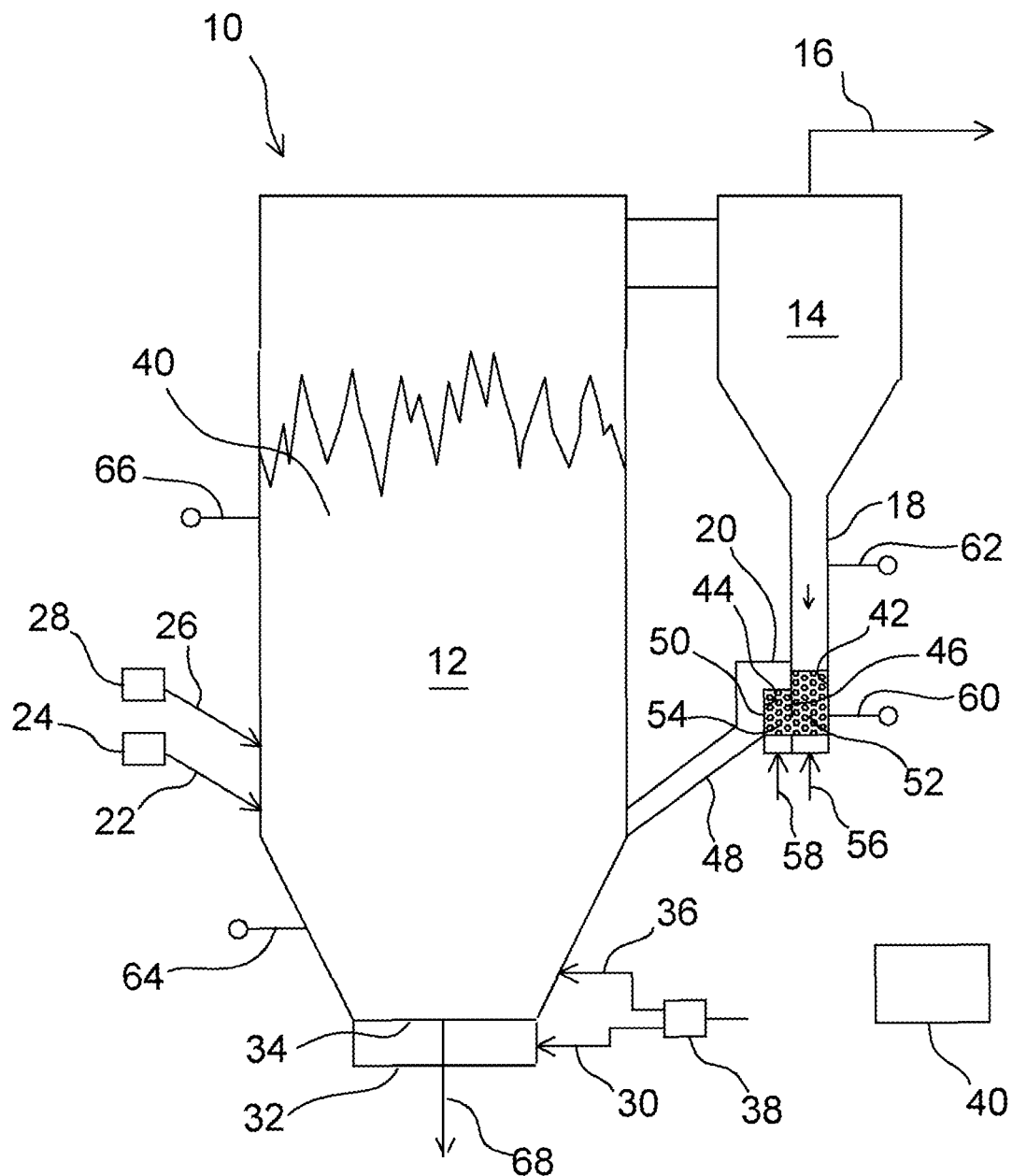
FIG. 1 schematically illustrates a circulating fluidized bed reactor suitable for using methods according to the present invention.

The diagram of FIG. 1 schematically illustrates an exemplary circulating fluidized bed reactor arrangement, a circulating fluidized bed boiler system 10, in which the method according to the present invention can be used. The boiler system comprises a furnace 12, an upper portion of which is in gas flow connection with a particle separator 14. An upper part of the particle separator is connected to a flue gas channel 16 for conveying flue gases to conventional further handling relating to, for example, flue gas cleaning or superheating of steam. A lower part of the particle separator is connected to a return leg 18, through which particles separated in the particle separator can be conveyed back to the lower portion of the furnace 12. The return leg 18 comprises a conventional gas seal 20 for preventing gas flow from the furnace via the return leg to the particle separator 14. The boiler system also comprises many other conventional elements, well-known to persons skilled in the art, which are, however, not described in the present patent application, because they are not relevant to the present invention.

When the boiler system 10 is in operation, fuel is fed to the furnace via a fuel feeder 22, such as a feeding chute or screw conveyor, from a fuel supply, not shown in FIG. 1. The fuel is fed at a rate controlled by a conventional control device 24, such as a lock hopper or a screw speed drive. Inert bed material is correspondingly fed to the furnace via an inert bed material feeder 26, such as a feeding chute or a conveying screw. The fuel, ash formed in combusting the fuel and the inert bed material, form a bed of particulate solid material in the furnace 12. The inert bed material, as well as possible auxiliary agents, such as limestone, relating to cleaning the flue gas or improving the bed quality, are advantageously fed to the furnace from respective supplies, not shown in FIG. 1, at a rate controlled by an auxiliary materials feed control device 28, such as a lock hopper or a screw speed drive. It is also possible that the boiler system comprises multiple separate systems for feeding different types of fuels, inert bed materials and auxiliary agents.

The fuel is combusted in the furnace 12 by combustion gas introduced to the furnace via a primary combustion gas channel 30, through a wind box 32 and a bottom grid 34 located below the furnace, and via a secondary combustion gas channel 36 ending above the bottom grid. The primary and secondary combustion gas channels 30, 36 comprise gas flow control means 38, such as fans and/or control valves, in flow connection with a combustion gas supply, not shown in FIG. 1, for controlling the rates of feeding the primary and secondary combustion gases to the furnace 12, respectively.

The bed of particulate solid material formed in the furnace is fluidized with the combustion gas at such a high velocity that the bed forms a so-called fast fluidized bed that does not have a definite upper surface, but fills the whole furnace 12 with an upwards decreasing density. The fast fluidized bed in the furnace 12 is in FIG. 1 depicted symbolically by a zig-zag upper layer. The fuel feed control means 24, auxiliary materials feed control device 28, and combustion gas flow control means 38 are arranged to receive control signals from a digital control system 40 of the boiler system 10, which is thus in operation used to define the load of the boiler system.

Due to the fast fluidized bed, flue gases generated in the combustion process emanate from the furnace entraining a relatively large amount of solid particles. Most of the entrained solid particles are separated from the flue gas in the particle separator 14, to be returned to the furnace via the return leg 18. Thus, when the boiler is in operation, there is a continuous flow of solid particles via the return leg. The gas lock 20 advantageously comprises a down leg 42 that is in direct particle flow connection with the particle separator 14 and a lift leg 44, a lower part of which is in particle flow connection with a lower part of the down leg 42. Thus, solid particles flowing downwards in the down leg 42 continue to the lift leg 44 below a lower edge of a first partition wall 46 that separates the lift leg from the down leg. Thereafter, the solid particles flow upwards in the lift leg 44, and from an upper portion of the lift leg as an overflow to a downpipe 48 leading to the furnace 12, over an upper edge of a second partition wall 50 that separates the downpipe 48 from the lift leg 44.

Continuous flow of solid particles via the gas lock 20 creates a first bed of particles 52 to the lower portion of the down leg 42 and a second bed of particles 54 to the lift leg 44. The gas lock advantageously comprises means 56, 58 for feeding fluidizing gas to the first and second beds of particles, respectively. Fluidizing gas is fed to the first and second beds of particles 52, 54 at a relatively low rate, whereby the first and second beds of particles are so-called bubbling beds, which behave more or less like a liquid with a definite upper surface.

The upper surface of the second bed of particles 54 is in operation always at the level of the upper edge of the second partition wall 50. If there were not any friction, or other non-ideal fluidization causing hindrances for the flow of particles through the first and second fluidized beds 52, 54, the upper surface of the first bed of particles 52 would be at the same level as that of the second bed of particles 54. However, in practice, the upper surface of the first bed of particles 52 is always, in operation of the boiler system, at a higher level than that of the second bed of particles 54. The difference in the heights of the first and second beds of particles 52, 54 depends on the load, i.e., on the rate of the flow of particles through the gas lock, and also on different non-ideal fluidization causing hindrances for the flow of particles. The non-ideal fluidization may be, for example, due to deposits falling from the upper part of the return leg, pulverizing of the particles of bed material to too small a size for proper fluidization, or agglomeration of particles so as to hamper the flow of the solid material. Geometry of the gas lock may in other embodiments of the present invention differ from that shown in FIG. 1, but it is essential that, in operation of the boiler system, in the gas lock is formed a bed of particles, a height of which depends on the rate of the particle flow through the gas lock and on possible hindrances for the particle flow.

Because deteriorating of the fluidization in the first and second beds of particles 52, 54 may gradually lead to blocking of the flow of the circulating bed material, the present invention is based on monitoring and analyzing the state of fluidization and the height of the first bed of particles. When an approaching blockage is observed at an early stage, it is possible to prevent the blocking of the flow of the circulating bed material by, in time, starting suitable counter measures. Observing an approaching blockage is advantageously based on measuring gas lock bed pressure values by a pressure gauge 60 within the continuously flowing bed of the solid particles in the gas lock, especially, at a lower portion of the first fluidized bed 52 in the down leg 42. Because the measured gas lock bed pressure values are usually rapidly fluctuating, observing approaching blockage is advantageously based on a gas lock bed height indication signal formed on the basis of the measured gas lock bed pressure values, for example, by averaging the gas lock bed pressure values over a predefined time, such as 10 seconds.

Because of the continuous and relatively intense flow of solid particles via gas lock 20, and, especially, via the first fluidized bed 52, the gas lock bed pressure values measured by the pressure gauge 60, and the gas lock bed height indication signals, tend, due to even small particle flow hindrances or causes of non-ideal fluidization, to run into an unregularly oscillating state. Thereby, the gas lock bed height indication signals recurrently grow and decrease with a considerable amplitude, well before the occurrence of an actual blockage. Therefore, when an abnormal behavior of the gas lock bed height indication signal is observed, it is possible to begin suitable counter measures to avoid blocking of the return leg 18.

Figure 2A:
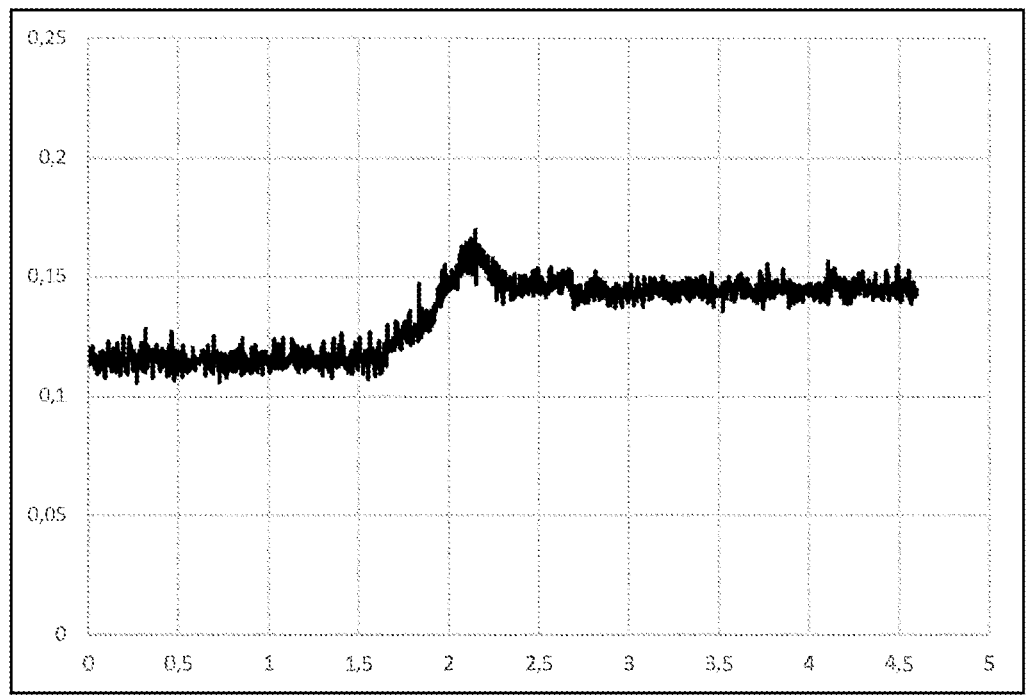
FIGS. 2a and 2b show examples of measured gas lock bed pressure values when a blockage is approaching and in normal solid particles circulation flow conditions, respectively.
Figure 2B:
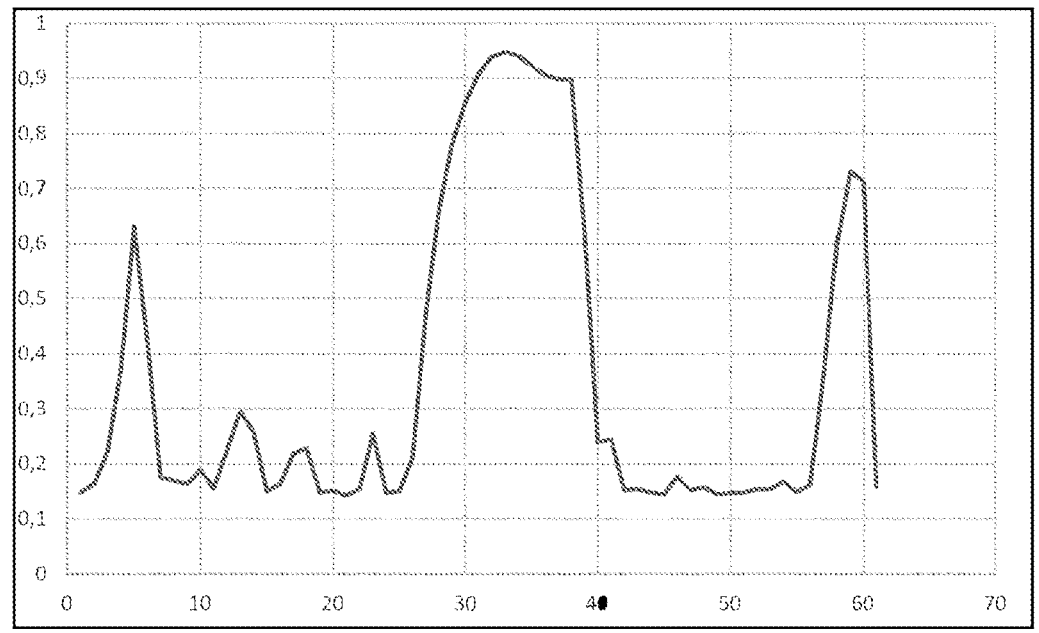

FIG. 2a shows an example of averaged differential gas lock bed pressure values measured during about 4.5 hours in normal solid particles circulation flow conditions of a circulating fluidized bed boiler, wherein the load was increased to a new value between about 1.5 hours and 2.2 hours from the beginning. FIG. 2b shows similar gas lock bed pressure values measured at ten second intervals during about ten minutes, several hours before a shutdown causing blocking of the return leg of the circulating fluidized bed boiler. As can be seen, the differential bed pressures in FIG. 2b show considerable variations when compared to corresponding pressure values in FIG. 2a. In the case of FIG. 2b, the particle circulation recovered spontaneously for about twelve hours from the abnormal bed pressure variations, but, eventually, the bed fluidization deteriorated to a non-recoverable, shutdown causing state. If the abnormal gas lock bed pressures had been observed in time, it could have been possible to avoid the shutdown.

Because the continuously flowing fluidized bed in the gas lock 20 is formed of particles separated from the flue gas emanating from the furnace 12 by the particle separator 14, the gas lock bed height depends on the boiler load, especially, on the rate of feeding combustion gas and fuel fed into the furnace. This effect can also be seen by comparing the averaged differential gas lock bed pressure values before and after a load change, as shown in FIG. 2a. Observing an approaching blockage can thus made by regularly comparing the prevailing gas lock bed height indication signals with a boiler load dependent range of normal gas lock bed height indication signals, which is obtained by measuring gas lock bed pressures or bed height indication signals, in normal solid particles circulation flow conditions, at multiple boiler load conditions. As an example, the range of normal gas lock bed height indication signals could be from about 0.13 to about 0.16 for the example shown in FIG. 2a, at the load used for obtaining the data on the right hand side of the figure.

The boiler load dependent range of normal gas lock bed height indication signals, as well as a boiler load dependent alarm criterion is advantageously stored to the digital control system 40. Fulfilment of the alarm criterion, for example, that the gas lock bed height indication signal is outside the range of normal gas lock bed height indication signals for the prevailing boiler load, then, indicates an abnormality, or a deviation, in the solid particles circulation flow. In the example of FIG. 2b, the averaged differential gas lock bed pressure values make excursions clearly outside the approximate range of normal gas lock bed height indication signals of the load, i.e., from 0.13 to 0.16, suggested above. It is also possible that the boiler load dependent alarm criterion is defined by more complicated functions of the gas lock bed pressure values including, for example, time derivates or trends of the gas lock bed pressure values.

The arrangement may advantageously comprise a pressure gauge 62 at a higher level of the return leg 18, typically, above the upper level of the first fluidized bed 52 in the down leg 42. Then, it is possible to reduce some disturbing variations from the pressure signals by defining the ranges of normal gas lock bed height indication signals, and corresponding boiler load dependent alarm criterions, on the basis of differential pressure values measured with the two pressure gauges 60, 62. It is also possible that the observation of abnormal flow conditions uses pressure values measured by a pressure gauge 64 at a lower portion of the furnace 12, and/or a pressure gauge 66 at a higher portion of the furnace. When circulating particles are temporarily cumulating to the return leg 18, it may be possible to observe a decreasing bed pressure in the furnace, and, thereby, get confirmation to the abnormal state in the return leg.

The gas lock bed height indication signals depend on the load of the reactor, i.e., on the rate of feeding fuel and combustion gas to the furnace. Therefore, in a definition state of the method, gas lock bed height indication signals are measured at several load conditions, defined by the digital control system 40, to define load dependence of the range of normal gas lock bed height indication signals. The gas lock bed height signals may in practice, also depend on other operation parameters of the boiler system, for example, on the rate of feeding inert bed material into the furnace. Therefore, advantageously, the range of normal gas lock bed height indication signals is defined and stored to digital control system 40 as a database of all relevant operation variables of the boiler system, for example, feeding rates and types of fuel and auxiliary materials.

In case an approaching blockage of circulating bed material is observed in time, it is often possible to avoid shutdown of the boiler by starting suitable counter measures by using the digital control system 40. Possible counter measures include, for example, decreasing the boiler load, increasing the feeding of inert bed material or auxiliary agents by the control means 28, and increasing the rate of removing bottom ash from the furnace by a bottom ash removing means 68. When the bed material circulation again becomes its normal state, the counter measures or at least part of them can be ended.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

The invention claimed is:

1. A method of preventing blockage of circulating bed material in a circulating fluidized bed reactor arrangement having a furnace, the method comprising steps of:
    defining a reactor load at a digital control system of the circulating fluidized bed reactor arrangement;
    feeding fuel and combustion gas at a predefined rate based on the reactor load into the furnace of the circulating fluidized bed reactor arrangement;
    combusting the fuel with the combustion gas in the furnace and causing flue gases and solid particles to emanate from the furnace into a flue gas channel;
    separating solid particles from the flue gases in a particle separator arranged in the flue gas channel and circulating a flow of solid particles from the particle separator via a return leg back into the furnace;
    collecting a continuously flowing bed of the solid particles in a gas lock in the return leg;
    measuring gas lock bed pressure values within the continuously flowing bed of the solid particles;
    generating a gas lock bed height indication signal on the basis of measured gas lock bed pressure values;
    executing a definition stage comprising the steps of:
        changing the reactor load defined at the digital control system sequentially to multiple load values;
        defining and storing to the digital control system a range of normal gas lock bed height indication signals, formed in normal solid particles circulation flow conditions, as a function of the reactor load; and
        defining and storing to the digital control system a reactor load dependent alarm criterion, the fulfillment of which comprises that a current gas lock bed height indication signal is outside the range of normal gas lock bed height indication signals for the prevailing reactor load, for indicating deviation in the flow of solid particles being circulated;
    comparing, at predetermined intervals, a current gas lock bed height indication signal with the reactor load dependent alarm criterion; and
    decreasing the reactor load in case the current gas lock bed height indication signal fulfills the reactor load dependent alarm criterion, for preventing blockage of the gas lock.

2. The method according to claim 1, wherein the gas lock bed height indication signal is formed by averaging measured gas lock pressure values over a predefined measuring time.

3. The method according to claim 2, wherein the predefined measuring time is at least ten seconds.

4. The method according to claim 3, wherein the predefined measuring time is at least thirty seconds.

5. The method according to claim 1, wherein the definition stage of the method further comprises defining and storing in the digital control system a reactor load dependent upper limit for the gas lock bed height indication signal, and the fulfillment of the reactor load dependent alarm criterion comprises that a current gas lock bed height indication signal is above the upper limit for the prevailing reactor load.

6. The method according to claim 1, wherein the fulfillment of the reactor load dependent alarm criterion comprises that a current gas lock bed height indication signal is at least three times within a predefined time above a predefined upper limit.

7. The method according to claim 1, further comprising a step of measuring a furnace bed pressure value within a bed of particles in the furnace, wherein the fulfillment of the reactor load dependent alarm criterion comprises that the furnace bed pressure value executes a decreasing trend at the same time as the gas lock bed height indication signal executes an increasing trend.

8. The method according to claim 7, wherein the criterion for a decreasing trend of the furnace bed pressure value includes that, by at least five percent monotonously decreasing values are observed in at least three consecutive, averaged furnace pressure values, and the criterion for increasing trend of the gas lock bed height indication signal includes that, by at least five percent monotonously increasing values are observed in at least three consecutive the gas lock bed height indication signals.

9. The method according to claim 1, further comprising, in case the reactor load dependent alarm criterion is fulfilled, a step of starting to feed inert bed material, or increasing the rate of feeding of inert bed material, into the furnace.

10. The method according to claim 1, further comprising, in case the reactor load dependent alarm criterion is fulfilled, a step of starting to discharge bottom ash, or increasing the rate of discharging bottom ash, from the furnace, so as to enhance bed material change.

11. The method according to claim 1, further comprising, in case the reactor load dependent alarm criterion is fulfilled, a step of changing type of the fuel fed to the furnace.

12. The method according to claim 1, further comprising, in case the reactor load dependent alarm criterion is fulfilled, a step of starting to feed limestone, or increasing feeding of limestone, into the furnace.

13. The method according to claim 1, further comprising, in case the reactor load dependent alarm criterion is fulfilled, a step of starting to feed, or increasing feeding of, a reagent suitable to diminish forming of alkaline compounds that melt or become sticky at the temperature prevailing in the furnace.

14. The method according to claim 1, further comprising, in case the reactor load dependent alarm criterion is fulfilled, a step of giving an alarm in the digital control system for potential blockage.

15. The method according to claim 1, further comprising, in case the fulfilment of the reactor load dependent alarm criterion is ceased, a further step of increasing the reactor load.

* * * * *